US009600211B1

(12) United States Patent
Takeuchi (10) Patent No.: US 9,600,211 B1
(45) Date of Patent: Mar. 21, 2017

(54) INFORMATION PROCESSING APPARATUS, INFORMATION PROCESSING METHOD, AND NON-TRANSITORY COMPUTER READABLE MEDIUM THAT ACQUIRE PRICES OF PAGES AND REPLACEMENT DOCUMENT (71) Applicant: FUJI XEROX CO., LTD., Tokyo (JP)

(72) Inventor: Yuichi Takeuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/053,367

(22) Filed: Feb. 25, 2016

(30) Foreign Application Priority Data

Sep. 2, 2015 (JP) .................................. 2015-172521

(51) Int. Cl.
*G06F 3/12* (2006.01)
*G06Q 30/04* (2012.01)
*G06K 15/00* (2006.01)

(52) U.S. Cl.
CPC .......... *G06F 3/1205* (2013.01); *G06F 3/1243* (2013.01); *G06F 3/1256* (2013.01); *G06F 3/1297* (2013.01); *G06Q 30/04* (2013.01)

(58) Field of Classification Search
CPC .... G06F 3/1205; G06F 3/1243; G06F 3/1296; G06F 3/1256; G06F 3/1297; G03G 21/02; H04N 1/00384; H04N 1/2307; H04N 1/2376; H04N 1/2338; G06Q 30/04; G06Q 30/06; G06T 11/00
USPC ..................................... 358/1.13, 1.15, 1.18
See application file for complete search history.

(56) References Cited

U.S. PATENT DOCUMENTS

| | | | | |
|---|---|---|---|---|
| 2002/0128933 | A1* | 9/2002 | Day | G06Q 30/06 705/26.35 |
| 2002/0198710 | A1* | 12/2002 | Hernandez-Abrego | G10L 15/10 704/240 |
| 2004/0249733 | A1* | 12/2004 | Clough | G06Q 30/04 705/34 |
| 2006/0066888 | A1* | 3/2006 | Uemura | G06F 3/1204 358/1.13 |
| 2006/0256363 | A1* | 11/2006 | Kayahara | H04N 1/00384 358/1.14 |
| 2012/0147412 | A1* | 6/2012 | Tsujimoto | H04N 1/00244 358/1.14 |

(Continued)

FOREIGN PATENT DOCUMENTS

JP 2007-073001 A 3/2007

*Primary Examiner* — Gabriel Garcia
(74) *Attorney, Agent, or Firm* — Oliff PLC (57) ABSTRACT

An information processing apparatus includes a unit that acquires information specifying prices of pages of a to-be-printed document, a unit that receives, from a user, an input of information identifying a not-to-be-printed page of the to-be-printed document, a replacement-document-acquiring unit that acquires at least one replacement document whose total price corresponds to a total price of the not-to-be-printed page identified based on the information, a printing controller that controls to cause a printing mechanism to print a document obtained by replacing the not-to-be-printed page with the acquired replacement document, and a billing unit that charges the user a total price of the printed pages of the to-be-printed document and charges a provider of the replacement document a price of the replacement document printed as a replacement for the not-to-be-printed page.

8 Claims, 5 Drawing Sheets

(56) References Cited

U.S. PATENT DOCUMENTS

2014/0098400 A1* 4/2014 Kaneko .................. G03G 15/50
358/1.15

* cited by examiner

| FILE ID | PROVIDER COMPANY ID | PROVISION NUMBER/ UPPER LIMIT NUMBER | PROVISION EXPIRATION DATE | UNIT PRICE (YEN) | BILLING AMOUNT (YEN) |
|---|---|---|---|---|---|
| XXXXX.pdf | COMPANY A | 50/200 | 3/31/2015 | 10 | 500 |
| YYYYY.pdf | COMPANY B | 2/100 | 4/20/2015 | 50 | 100 |
| ZZZZZ.jpg | COMPANY C | 0/100 | 3/20/2015 | 100 | 0 |
| ... | ... | ... | ... | ... | ... |

| FILE ID | PROVISION TARGET 1 | PROVISION TARGET 2 |
|---------|--------------------|--------------------|
| XXXXX.pdf | DOCUMENT A | DOCUMENT B |
| YYYYY.pdf | DOCUMENT A | DOCUMENT C |
| ZZZZZ.jpg | ENTIRE DOCUMENT | |
| ... | ... | ... |

INFORMATION PROCESSING APPARATUS, INFORMATION PROCESSING METHOD, AND NON-TRANSITORY COMPUTER READABLE MEDIUM THAT ACQUIRE PRICES OF PAGES AND REPLACEMENT DOCUMENT

CROSS-REFERENCE TO RELATED APPLICATIONS

This application is based on and claims priority under 35 USC 119 from Japanese Patent Application No. 2015-172521 filed Sep. 2, 2015.

BACKGROUND (i) Technical Field

The present invention relates to an information processing apparatus, an information processing method, and a non-transitory computer readable medium.

(ii) Related Art

There is a printing service using a multifunction machine (an apparatus having functions of serving as a copying machine, a printer, a scanner, and the like) that is installed in a store, such as a convenience store, to print documents, such as musical scores, maps, bromides (photographic portraits), newspapers, catalogs, and pamphlets. The prices of such documents are set beforehand, and the multifunction machine prints out one of the documents once a user has paid an amount equal to the price of the document by using a payment device that comes with the multifunction machine.

In the case of a document having plural pages, such as a musical score, a newspaper, a catalog, or a pamphlet, a user may sometimes desire to print only some of the pages and consider the rest of the pages as unnecessary pages. In the case where the pages are sold individually, the user may pay an amount equal to the total price of the pages desired to be printed and print only the desired pages. However, there is a case where a seller of such documents has a reason for desiring to sell the documents on a document-by-document basis instead of selling the documents on a page-by-page basis. In such a case, the user needs to print the entire document including the unnecessary pages and pay an amount equal to the price set for the document.

SUMMARY

According to an aspect of the invention, there is provided an information processing apparatus including an acquiring unit that acquires information specifying prices of pages of a to-be-printed document that is a document to be printed, a unit that receives, from a user, an input of identification information identifying at least one not-to-be-printed page that is a page that will not be printed among the pages of the to-be-printed document, a replacement-document-acquiring unit that acquires at least one replacement document whose total price corresponds to a total price of the at least one not-to-be-printed page, which is identified on a basis of the identification information;

a printing controller that performs control in such a manner as to cause a printing mechanism to print a document obtained by replacing the at least one not-to-be-printed page of the to-be-printed document with the at least one replacement document, which has been acquired, and a billing unit that charges the user a total price of the pages of the to-be-printed document, which have been printed, and that charges a provider of the at least one replacement document a price of the at least one replacement document, which has been printed as a replacement for the at least one not-to-be-printed page.

BRIEF DESCRIPTION OF THE DRAWINGS

An exemplary embodiment of the present invention will be described in detail based on the following figures, wherein.

DETAILED DESCRIPTION

The configuration of a system according to an exemplary embodiment of the present invention will be described with reference to FIG. 1.

Figure 1:
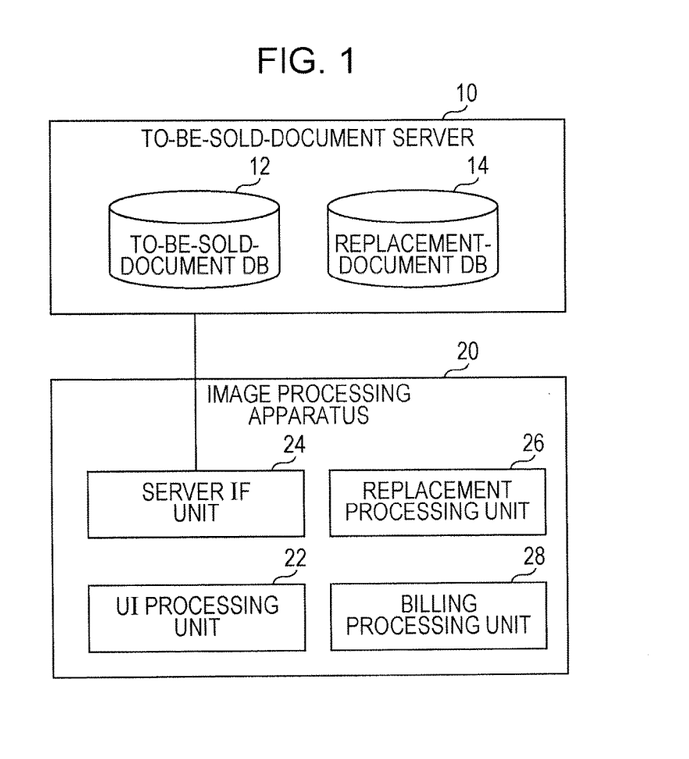
FIG. 1 is a diagram illustrating a configuration of a system according to an exemplary embodiment of the present invention.

As illustrated in FIG. 1, the system according to the present exemplary embodiment includes a to-be-sold-document server 10 and an image processing apparatus 20.

The to-be-sold-document server 10 is a server that manages electronic data items of documents that are to be sold by being printed using the image processing apparatus 20. Examples of the documents that are to be sold (hereinafter referred to as to-be-sold documents) include musical scores, newspapers, catalogs, and pamphlets. The to-be-sold-document server 10 includes a to-be-sold-document database (DB) 12 and a replacement-document DB 14.

The to-be-sold-document DB 12 is a database that holds data items of the to-be-sold documents. Each of the data items of the documents registered in the to-be-sold-document DB 12 includes a document file, which is the body of the document, an information item regarding the selling price of the document, and an information item that determines the prices of the pages of the document.

Here, the term "prices of the pages" does not refer to the price set for each of the pages in order to sell the pages individually on a page-by-page basis but refers to the different prices set for the pages to be used in the calculation of the selling price of the document, the different prices being amounts obtained by dividing the selling price of the document by the number of the pages and allocated among the pages. The sum of the prices of all the pages of the document is the selling price of the document. The manner in which each of the information items determines the "prices of the pages" is not particularly limited. For example, one of the information items may be an information item that directly indicates the prices of the pages or may be a rule for dividing the selling price of the document by the total number of the pages (e.g., dividing the selling price of the document equally). Alternatively, the information item may include both of these information items. For example, among the pages, the prices of some specific pages are directly specified, and the prices of the rest of the pages are determined by dividing the selling price of the document equally by the number of the rest of the pages.

The replacement-document DB 14 is a database that holds data items of replacement documents. The replacement documents are documents with which pages of the to-be-sold documents, each of the pages being specified as an unnecessary page by a user (purchaser who purchases the documents), are replaced. The prices of the replacement documents are set beforehand, and at least one replacement document, whose total price corresponds to the total price of the pages that have been specified as unnecessary pages by the user, is selected and printed as a result of the unnecessary pages of the to-be-sold documents being replaced with the at least one replacement document. Each of the prices of the replacement documents is the amount of money that is provided by a provider of the replacement document each time the replacement document is printed.

In the system according to the present exemplary embodiment, when printing one of the to-be-sold document, a replacement document that has been selected is printed instead of an unnecessary page. A provider of the replacement document, which has been printed, pays for the printed replacement document. The sum of the amount of money paid by the user and the amount of money paid by the provider of the replacement document is equal to the selling price of the to-be-sold document, and an amount of money equal to the selling price is paid to the seller of the to-be-sold document. As described above, in the present exemplary embodiment, the provider of a replacement document bears part of the printing cost equal to the price of an unnecessary page in return for printing the replacement document, and as a result, an amount of money equal to the selling price of a document is paid to the seller of the document while a user only pays for necessary pages. A clear example of a replacement document is an advertisement for a product or a service. By way of another example, it is also assumed that documents that relate to public relations, such as public relations magazines of a local government and the like, are provided as the replacement documents.

In addition to the replacement documents, management information items that indicate the prices of the replacement documents and the like are registered in the replacement-document DB 14.

Figure 2:
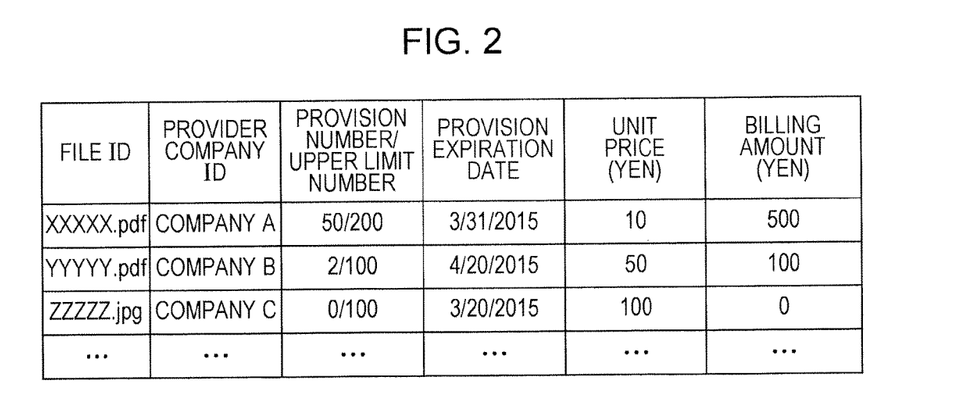
FIG. 2 is a table illustrating an example of data registered in a replacement-document DB.

FIG. 2 illustrates an example of the management information items of the replacement documents. Each of the management information items of the replacement documents registered in the replacement-document DB 14 includes items that relate to the corresponding replacement document, the items including "file ID", "provider company ID", "provision number/upper limit number", "provision expiration date", "unit price", and "billing amount". The "file ID" is an identification information item of the corresponding replacement document file, and for example, the file path information of the file may be used. Note that each of the replacement documents may be a document having one page or a document having plural pages. The "provider company ID" is an identification information item of a company (or one of organizations such as various groups other than companies) who is a provider of the replacement document. Regarding the "provision number/upper limit number", the "provision number" is the number of times the replacement document has been actually printed as a replacement for an unnecessary page. The "upper limit number" is the maximum number of times the replacement document is allowed to be printed. The providers of the replacement documents employ a method of providing information using such replacement documents as one of advertisement methods and the like within a predetermined budget for advertisement, public relations, and the like, and the budget used for the method is often set beforehand. The "upper limit number" corresponds to this budget amount (strictly speaking, unit price×upper limit number=budget amount). The "provision expiration date" is the last day of a period during which the replacement document is provided. The "unit price" is the amount of money to be paid by the provider of the replacement document once the replacement document has been printed as a replacement for an unnecessary page. In other words, the "unit price" is the price of the replacement document. The "billing amount" is the amount of money an administrator of the system charges the provider of the replacement document for the replacement document, and the amount is obtained by "unit price"× "provision number". In this example, after the "provision expiration date" of the replacement document has passed, the system administrator collectively charges the provider of the replacement document an amount of money regarding the replacement document, that is, the "billing amount".

Returning to FIG. 1, the configuration of the image processing apparatus 20 will now be described. The image processing apparatus 20 is an apparatus that is installed in a store, such as a convenience store, and that has a print function. A multifunction machine is an example of the image processing apparatus 20. The image processing apparatus 20 is capable of communicating with the to-be-sold-document server 10 via a local area network or the Internet. The image processing apparatus 20 includes a user interface (UI) processing unit 22, a server interface (IF) unit 24, a replacement processing unit 26, and a billing processing unit 28.

The UI processing unit 22 performs processing for a user-interface function of the image processing apparatus 20. In the context of the present exemplary embodiment, the UI processing unit 22 provides a UI screen for purchasing (printing out) one of the to-be-sold documents provided by the to-be-sold-document server 10 and receives input information with respect to the UI screen from a user. Then, the UI processing unit 22 informs a related processing unit of the received input information. The UI screen for purchasing a document includes a document-selection screen used for selecting a document to be purchased and a page-selection screen used for selecting a necessary page (i.e., a page to be printed) or an unnecessary page (a page not to be printed) of the selected document. Note that, in the present exemplary embodiment, each page of the to-be-sold documents is either necessary or unnecessary for a user (purchaser). Thus, in the case of selecting a page that is necessary for a user, a page that has not been selected is automatically determined to be an unnecessary page for the user. In contrast, in the case of selecting a page that is unnecessary for the user, a page that has not been selected is automatically determined to be a necessary page for the user. In the UI processing unit 22, the operation of selecting pages may be performed in either one of the manners described above. As a result of performing the page selecting operation, a page that has been determined to be a necessary page for a user is printed, and a page that has been determined to be an unnecessary page for the user is replaced with one of the replacement documents instead of being printed.

The server IF unit 24 exchanges information with the to-be-sold-document server 10. For example, the server IF unit 24 receives list information regarding the to-be-sold documents (e.g., a webpage of the document-selection screen including the list information) from the to-be-sold-document server 10 and passes the list information to the UI processing unit 22. In addition, the server IF unit 24 transmits the identification information of a document to be purchased that has been selected by a user from the list information to the to-be-sold-document server 10. Furthermore, for example, the server IF unit 24 receives a document file transmitted by the to-be-sold-document server 10 and passes the document file to processing units, such as the UI processing unit 22 and the replacement processing unit 26.

The replacement processing unit 26 performs processing for replacing a group of pages of a document that has been specified to be purchased, the group of pages being selected by a user and determined to be unnecessary pages for the user, with at least one replacement document. Document data that will ultimately be printed is completed through this replacement processing. The document, which is to be printed, includes a page of the document, which is to be purchased, the page being necessary for the user, and the at least one replacement document.

The billing processing unit 28 performs billing processing with respect to a document that is purchased by a user and printed out. More specifically, the billing processing unit 28 charges the user the total price of necessary pages for the user (pages to be printed) of a document that is to be printed out and charges the providers of the replacement documents, with which unnecessary pages for the user are replaced, for the replacement documents. Regarding the charging of money to the user, for example, the user may pay a necessary amount of money by using a money collecting device, an electronic-money reader, or the like that comes with the image processing apparatus 20. On the other hand, the charging of money to the providers of the replacement documents may be performed in the following manner in the present exemplary embodiment. The billing processing unit 28 informs the to-be-sold-document server 10 of the fact that the replacement documents have been printed, and in response to this, the to-be-sold-document server 10 increments the "provision number" (see FIG. 2) of each of the replacement documents by one.

An example of a process according to the present exemplary embodiment will now be described with reference to FIG. 3.

A user selects document purchase on a menu, which is displayed on a display screen (e.g., touch panel) of the image processing apparatus 20. In response to this, the server IF unit 24 of the image processing apparatus 20 acquires the document-selection screen, on which a list of documents that are available for purchase (to-be-sold documents) is displayed, from the to-be-sold-document server 10, and the UI processing unit 22 causes the document-selection screen to be displayed on the display screen. The document-selection screen may be hierarchically configured so as to include, for example, a genre-selection screen used for selecting a genre and a screen used for selecting a document to be purchased in a selected genre. The UI processing unit 22 receives selection of a document that is to be purchased (printed) from a user via the document-selection screen (S10). In response to this, the server IF unit 24 downloads a file of the selected document, an information item regarding the selling price of the document, and an information item that determines the prices of the pages of the document from the to-be-sold-document server 10 (S12). Then, the UI processing unit 22 receives, from the user, an instruction specifying printing the entire document or an instruction specifying selecting pages to be printed (S14). In the case where the printing of the entire document is specified, the UI processing unit 22 displays the selling price of the document for the user, and the billing processing unit 28 receives an amount of money equal to the selling price from the user (S16). After the user has completed the payment, the image processing apparatus 20 prints out the document (S18). The processes of S16 and S18 are the same as those of a selling process on a document-by-document basis of the related art.

In the case where the UI processing unit 22 receives an instruction specifying selecting pages, the UI processing unit 22 displays the page-selection screen and receives selection of necessary pages (or unnecessary pages) from the user via the page-selection screen (S20). For example, thumbnail images of the pages of the document selected by the user are displayed on the page-selection screen in order to enable the user to roughly recognize the contents of the pages. Alternatively, more detailed images of the pages may be displayed in order to enable the user to confirm the contents of the pages in further details. The user selects necessary pages (or unnecessary pages) on the page-selection screen.

After the user has selected the pages, the billing processing unit 28 refers to the information item that determines the prices of the pages, which has been acquired from the to-be-sold-document server 10 together with the file of the document, and calculates the total price of the pages necessary for the user and the total price of the pages unnecessary for the user (S22). Then, the billing processing unit 28 causes the total price of the pages necessary for the user to be displayed on the screen and makes a request to the user for the payment (S24).

The image processing apparatus 20 (the server IF unit 24) acquires a replacement document whose price corresponds to the total price of the unnecessary pages from the to-be-sold-document server 10 (S26). Here, the total price of at least one replacement document, which is acquired, is not particularly limited as long as the total price corresponds to the total price of the unnecessary pages. Typically, a price corresponding to the total price of unnecessary pages refers to a price equal to the total price of the unnecessary pages. However, the term in the present exemplary embodiment is not limited to this. There is a case where, depending on the price setting of a group of replacement documents stored in the replacement-document DB 14, it is difficult to obtain a price equal to the total price of unnecessary pages in any combinations of the replacement documents included in the group. In such a case, for example, a combination of the replacement documents is calculated in such a manner that the difference between the total price of the replacement documents in the combination and the total price of the unnecessary pages is within a predetermined acceptable range. In the case where the total price of the replacement documents in the calculated combination exceeds the total price of the unnecessary pages, the amount of money charged to each of the providers of the replacement documents may be reduced by an amount equal to the difference (the excess amount). In the case where the total price of the replacement documents in the calculated combination falls below the total price of the unnecessary pages, the administrator of the system may compensate for the difference such that the amount of money equal to the selling price of the purchased document may be paid to the seller of the document.

In S26, the operation of selecting a replacement document whose price corresponds to the total price of unnecessary pages may be performed by the to-be-sold-document server 10 or by the image processing apparatus 20. In the case where the to-be-sold-document server 10 performs the selecting operation, the image processing apparatus 20 may inform the to-be-sold-document server 10 of "the total price of unnecessary pages", and the to-be-sold-document server 10 may select, on the basis of the total price, a group of replacement documents whose price corresponds to the total price. In the case where the image processing apparatus 20 performs the selecting operation, the image processing apparatus 20 may acquire a list of the prices of replacement documents from the to-be-sold-document server 10 and perform the selecting operation with reference to the list.

Note that, when selecting the replacement documents in S26, among the replacement documents stored in the replacement-document DB 14, the replacement documents each of whose provision expiration date has passed and the replacement documents each of whose provision number has reached its upper limit will not be selected.

After the process of S26 has been performed, the replacement processing unit 26 removes pages that are unnecessary for the user from an electronic data item of the document, which has been selected in S10 and which is to be printed, and adds an electronic data item of the group of replacement documents acquired in S26 to the electronic data item of the document to be printed as replacements for the unnecessary pages (S28). Here, as an example, the pages of the group of replacement documents, which are to be added, are arranged at the front of a group of pages that are necessary for the user in the document to be printed (S28).

After the page order of the document has been adjusted in the manner described above, the data of the document is printed by a printing mechanism of the image processing apparatus 20 (S30). When the data of the document, whose page order has been adjusted, is printed, the group of the pages of the replacement documents is printed out first, after which the group of the pages selected (explicitly or implicitly) by the user as necessary pages is printed out. Note that when performing the adjustment of the page order in the manner described above, a message indicating that the replacement documents are to be printed first, after which the purchased document is to be printed may be displayed on the display screen of the image processing apparatus 20.

After the printing operation has been completed, the image processing apparatus 20 informs the to-be-sold-document server 10 of information that identifies the replacement documents, which have been printed as replacements for the unnecessary pages of the purchased document (S32). The to-be-sold-document server 10 increments the "provision number" of each of the replacement documents identified by the information, of which the to-be-sold-document server 10 has been informed, in the replacement-document DB 14 by one and increases the "billing amount" of each of the replacement documents by an amount equal to the corresponding "unit price".

Figure 4:
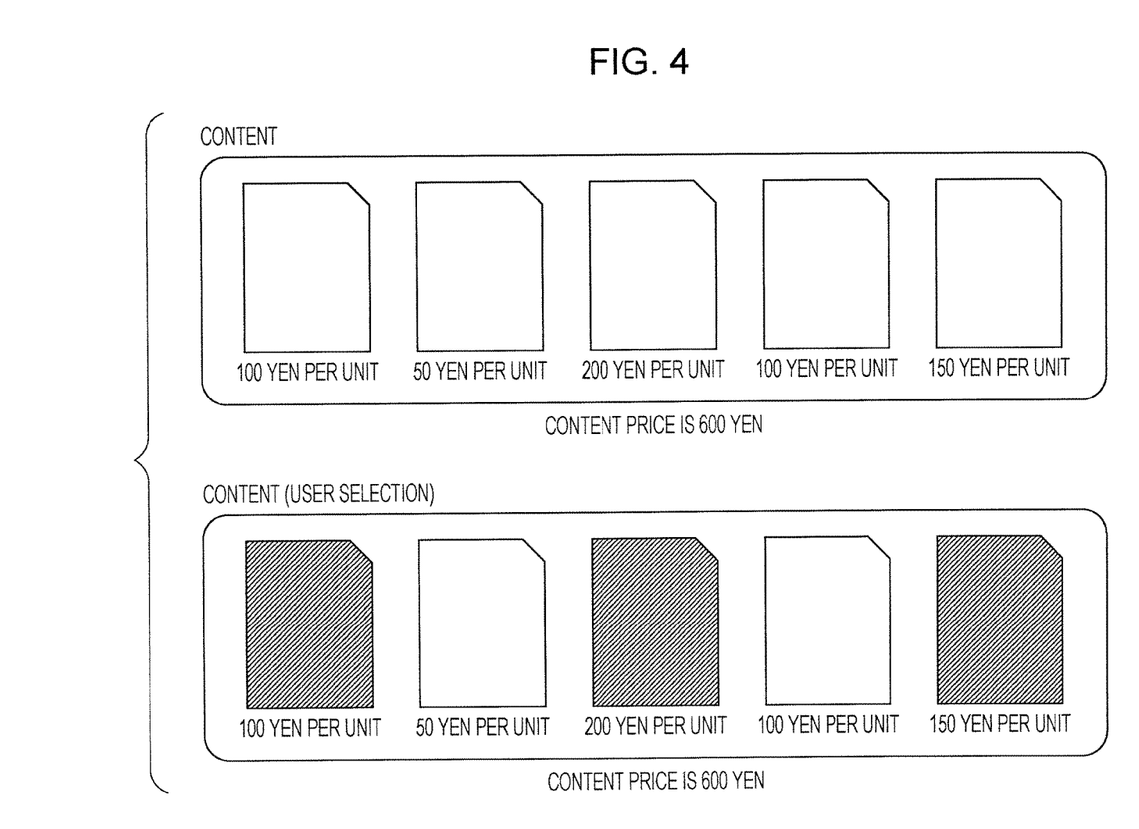
FIG. 4 is a diagram for illustrating the process according to the exemplary embodiment.
Figure 5:
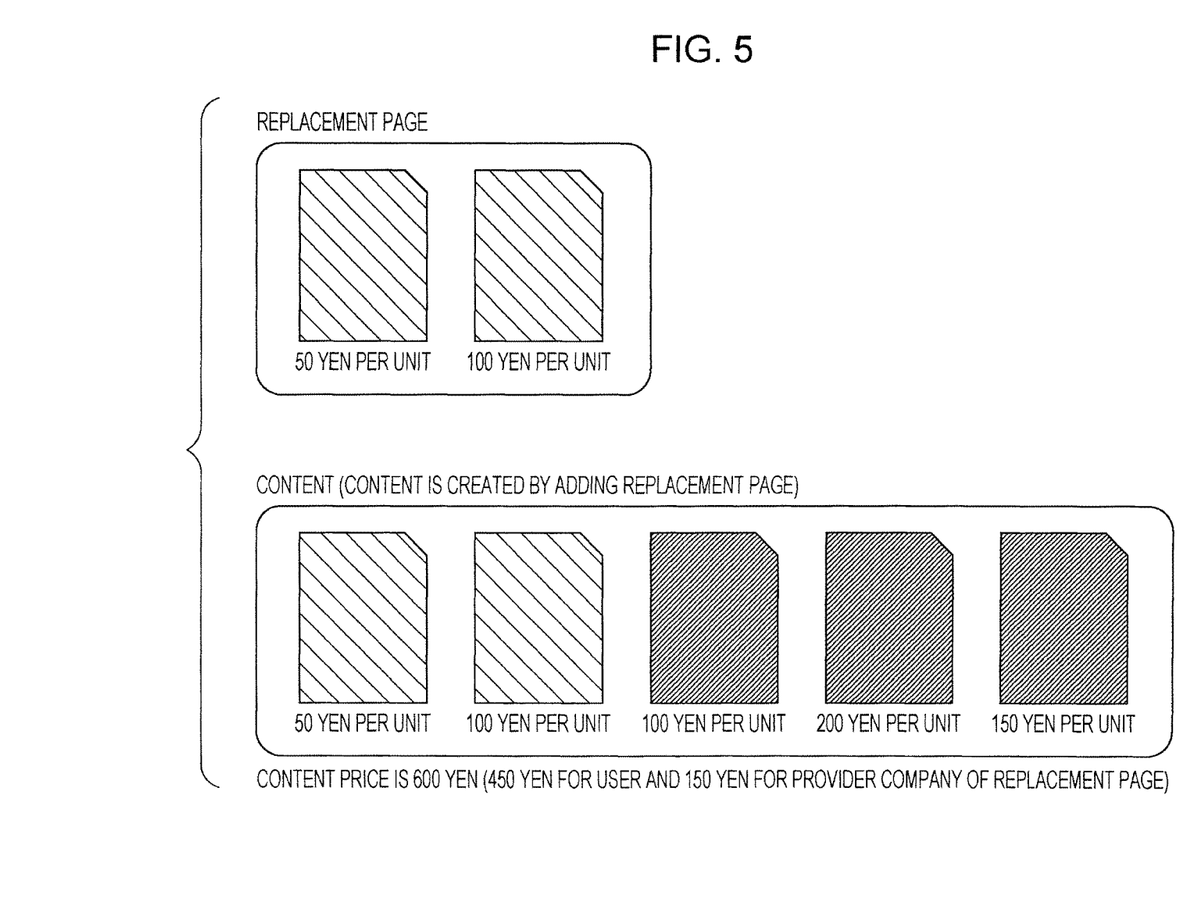
FIG. 5 is a diagram for illustrating the process according to the exemplary embodiment.

The processes of S20 to S30 illustrated in FIG. 3 will now be described using a specific example illustrated in FIG. 4 and FIG. 5. As illustrated in an upper portion of FIG. 4, assume that a user selects a content (document) that has five pages in total and whose selling price is 600 yen, the unit price of each of the five pages being set beforehand. In addition, as illustrated in a lower portion of FIG. 4, assume that the user selects the first, third, and fifth pages of the content as necessary pages (S20). In this case, the total price of the necessary pages is 450 yen, and the total price of unnecessary pages is 150 yen (S22). In this case, the billing processing unit 28 charges the user 450 yen (S24). The image processing apparatus 20 or the to-be-sold-document server 10 searches for replacement documents whose total price is 150 yen. In this example, as illustrated in an upper portion of FIG. 5, assume that a single page replacement document whose unit price is 50 yen and a single page replacement document whose unit price is 100 yen have been found. The image processing apparatus 20 acquires these two replacement documents from the to-be-sold-document server 10 (S26). Subsequently, as illustrated in a lower portion of FIG. 5, the replacement processing unit 26 removes the unnecessary two pages from the selected document. Then, the replacement processing unit 26 generates a document to which the two replacement documents are added as the replacements for the unnecessary two pages in such a manner as to be positioned at the start of the document in the page order (S28) and passes the document to the printing mechanism (S30).

The configuration of the system according to the exemplary embodiment and the process performed by the system have been described above.

Figure 3:
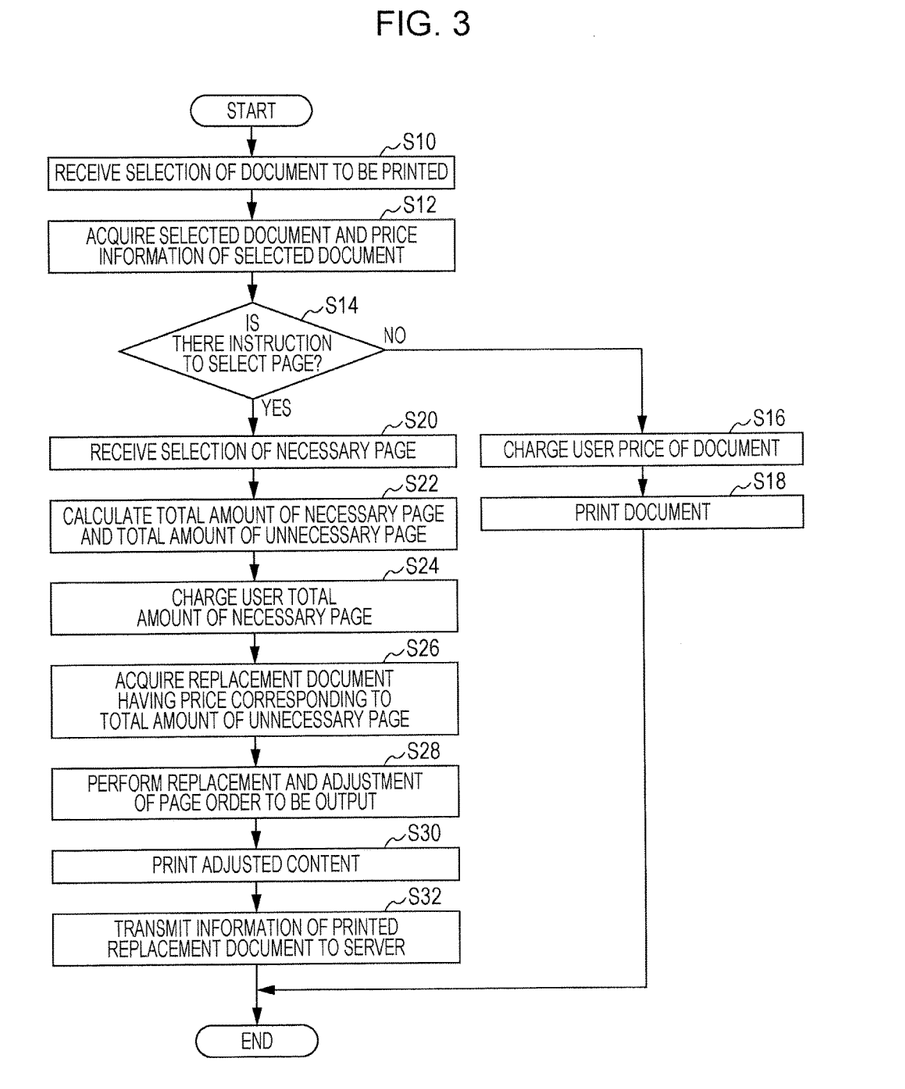
FIG. 3 is a flowchart illustrating an example of a process performed by an image processing apparatus.

In the above example, although the restrictions on the selection of replacement documents in S26 of FIG. 3 include the provision number and the provision expiration date, these are merely examples. There may be another exemplary embodiment without some of the above restrictions or may be another exemplary embodiment with an additional restriction. As an example of an additional restriction, the to-be-sold documents that are provision targets for the replacement documents may be limited depending on the replacement documents.

Figure 6:
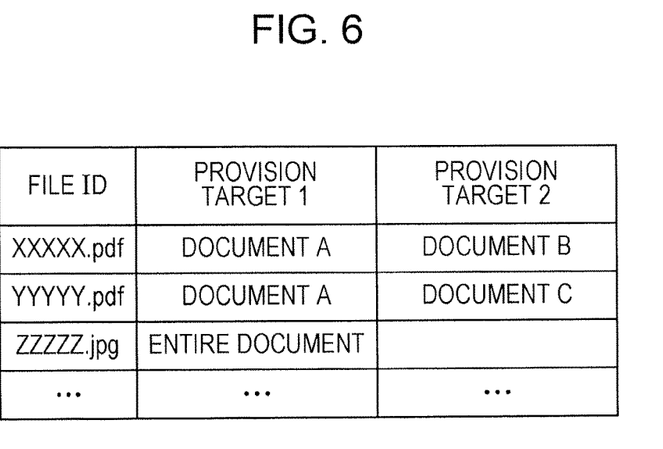
FIG. 6 is an exemplary table showing provision targets selectable for each replacement document.

For example, as illustrated in FIG. 6, a provision target table is prepared. In the provision target table, the document IDs of the to-be-sold documents that are selectable as provision targets for replacement documents are registered in such a manner as to be associated with the file IDs of the corresponding replacement documents. In the example illustrated in FIG. 6, a replacement document "XXXXX.pdf" may be provided for two of the to-be-sold documents, which are a "document A" and a "document B", as a replacement for an unnecessary page of each of the two documents. Accordingly, when a user selects a "document C" as a document to be printed, the replacement document "XXXXX.pdf" will not become a choice. Although there are only two columns of the provision targets for the replacement documents in the table illustrated in FIG. 6 as an example, obviously, it is not necessary to set a limit on the number of provision targets. Note that the provision targets for the replacement documents may be decided by the providers who provide the corresponding replacement documents. For example, each of the providers may select one of the to-be-sold documents that is appropriate for the contents of the replacement document provided by the provider and may register the document in the table as the provision target for the replacement document.

In S26, when selecting a replacement document, which is to be used in a replacement operation, in addition to the criterion for determining a replacement document that is not to be selected, the criterion being used not to select a replacement document whose provision expiration date has passed, a criterion for selecting a replacement document to which higher priority is given, the criterion being to be used to give higher priority to a replacement document whose provision expiration date is close (has not yet passed) than to a replacement document whose provision expiration date is not close and select the replacement document with the higher priority first, may be used. In other words, when selecting a replacement document that is to be actually used in a replacement operation from plural replacement documents under the same conditions (e.g., price, provision number not in excess of the upper limit, and the like) except with regard to the provision expiration date, the replacement document whose provision expiration date is the closest among the plural replacement documents (obviously, excluding the replacement document whose provision expiration date has passed) is selected.

The function sharing between the to-be-sold-document server 10 and the image processing apparatus 20 that are illustrated in FIG. 1 and that have been described above are merely examples. For example, as another example of the function sharing, the image processing apparatus 20 may only function as a printing mechanism and a user-interface mechanism, and the to-be-sold-document server 10 may perform substantial processing for replacing pages, billing, and the like (i.e., the functions of the replacement processing unit 26 and the billing processing unit 28). Alternatively, the to-be-sold-document server 10 may be eliminated. In this case, the image processing apparatus 20 includes the to-be-sold-document DB 12 and the replacement-document DB 14 and performs the above-described processing by referencing to the to-be-sold-document DB 12 and the replacement-document DB 14.

The to-be-sold-document server 10 and the image processing apparatus 20, each of which has been described above as an example, are realized by, causing a computer to execute programs that represent the functions of the to-be-sold-document server 10 and the image processing apparatus 20. Here, the computer has a circuit configuration in which, as hardware, for example, a microprocessor such as a CPU, memories (first memories), such as a random access memory (RAM) and a read only memory (ROM), a hard-disk-drive (HDD) controller that controls an HDD, various input/output (I/O) interfaces, a network interface that performs control for connection with a network such as a local area network, and the like are connected to one another via, for example, a bus. A disc drive that is used for performing read and/or write operations on a transportable disc recording media such as CDs and DVDs, a memory reader-writer that is used for performing read and/or write operations on transportable non-volatile recording media of various standards such as flash memories, and the like may be connected to the bus via, for example, the I/O interfaces. Programs in which the contents of processing to be performed by each of the functional modules, which have been described above as examples, are written are stored in a stationary memory device such as hard disk drive via a recording medium, such as a CD or a DVD, or via a communication unit, such as a network, and installed in a computer. The programs stored in the stationary memory device are read by the RAM and executed by the microprocessor such as a CPU, and as a result, a functional module group that have been described above as examples, are realized.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    an acquiring unit that acquires information specifying prices of pages of a to-be-printed document that is a document to be printed;
    a unit that receives, from a user, an input of identification information identifying at least one not-to-be-printed page that is at least one page that will not be printed among the pages of the to-be-printed document;
    a replacement-document-acquiring unit that acquires at least one replacement document whose total price corresponds to a total price of the at least one not-to-be-printed page, which is identified on a basis of the identification information;
    a printing controller that performs control in such a manner as to cause a printing mechanism to print a document obtained by replacing the at least one not-to-be-printed page of the to-be-printed document with the at least one replacement document, which has been acquired; and
    a billing unit that charges the user a total price of the pages of the to-be-printed document, which have been printed, and that charges a provider of the at least one replacement document a price of the at least one replacement document, which has been printed as a replacement for the at least one not-to-be-printed page.

2. The information processing apparatus according to claim 1,
    wherein the printing controller performs control in such a manner that the at least one replacement document is printed before the pages of the to-be-printed document excluding the at least one not-to-be-printed page are printed.

3. The information processing apparatus according to claim 2, further comprising:
    a unit that causes a display device that corresponds to the printing mechanism to display information indicating that the at least one replacement document is to be output before the pages of the to-be-printed document are output.

4. The information processing apparatus according to claim 1, further comprising:
    a selection unit that selects, on a basis of information specifying documents that are selectable as provision targets for replacement documents, at least one replacement document whose total price corresponds to the total price of the at least one not-to-be-printed page among replacement documents for each of which the to-be-printed document is selectable as a provision target and that causes the acquiring unit to acquire the at least one replacement document.

5. The information processing apparatus according to claim 2, further comprising:
    a selection unit that selects, on a basis of information specifying documents that are selectable as provision targets for replacement documents, at least one replacement document whose total price corresponds to the total price of the at least one not-to-be-printed page among replacement documents for each of which the to-be-printed document is selectable as a provision target and that causes the acquiring unit to acquire the at least one replacement document.

6. The information processing apparatus according to claim 3, further comprising:
    a selection unit that selects, on a basis of information specifying documents that are selectable as provision targets for replacement documents, at least one replacement document whose total price corresponds to the total price of the at least one not-to-be-printed page among replacement documents for each of which the to-be-printed document is selectable as a provision target and that causes the acquiring unit to acquire the at least one replacement document.

7. An information processing method comprising:
acquiring information specifying prices of pages of a to-be-printed document that is a document to be printed;
receiving, from a user, an input of identification information identifying at least one not-to-be-printed page that is at least one page that will not be printed among the pages of the to-be-printed document;
acquiring at least one replacement document whose total price corresponds to a total price of the at least one not-to-be-printed page, which is identified on a basis of the identification information;
performing control in such a manner as to cause a printing mechanism to print a document obtained by replacing the at least one not-to-be-printed page of the to-be-printed document with the at least one replacement document, which has been acquired; and
billing the user a total price of the pages of the to-be-printed document, which have been printed, and charging a provider of the at least one replacement document a price of the at least one replacement document, which has been printed as a replacement for the at least one not-to-be-printed page.

8. A non-transitory computer readable medium storing a program causing a computer to perform a process, the process comprising:
acquiring information specifying prices of pages of a to-be-printed document that is a document to be printed;
receiving, from a user, an input of identification information identifying at least one not-to-be-printed page that is at least one page that will not be printed among the pages of the to-be-printed document;
acquiring at least one replacement document whose total price corresponds to a total price of the at least one not-to-be-printed page, which is identified on a basis of the identification information;
performing control in such a manner as to cause a printing mechanism to print a document obtained by replacing the at least one not-to-be-printed page of the to-be-printed document with the at least one replacement document, which has been acquired; and
billing the user a total price of the pages of the to-be-printed document, which have been printed, and charging a provider of the at least one replacement document a price of the at least one replacement document, which has been printed as a replacement for the at least one not-to-be-printed page.

* * * * *